United States Patent Office 2,791,734
Patented May 7, 1957

2,791,734

SINGLE-PHASE SYNC SIGNAL CONTROL OF THREE-PHASE SYNCHRONOUS MOTORS

Pierre Albert Kieffert, Neuilly-sur-Seine, France, assignor to Etablissements Ed. Jaeger, Levallois-Perret, Seine, France Application June 10, 1954, Serial No. 435,824

Claims priority, application France June 11, 1953

10 Claims. (Cl. 318—171)

This invention relates in general to means for controlling a three-phase synchronous motor from single-phase sync signals of any waveform.

The main object of the present invention is to provide a device for converting single-phase sync signals into three-phase current which comprises an intermediate circuit having three lines to which are respectively applied the first, second and third signals in each successive group of three single-phase sync signals, in order to obtain in said three lines signals which are equally out-of-phase with respect to each other, respectively, for forming a three-phase current the frequency of which is therefore equal to one third of the frequency of the single phase sync signals, the signal power in said lines being amplified through separate power amplifier channels respectively connected through amplifiers to three lines forming a load circuit whereby the three lines of said load circuit may be used as a three-phase circuit, more particularly for directly energizing a three-phase synchronous motor.

Another object of the present invention is to provide a three-phase control device of the character described, more particularly for three-phase synchronous motors, wherein a ring-of-three circuit has a leading tube to the input of which the single-phase sync signals are applied, the three tubes of said ring-of-three circuit being respectively connected through their anode circuit to the lines of the intermediate three-phase circuit, whereby said lines receive alternately the counts of said ring-of-three circuit, said lines being respectively connected to the power tubes of three separate power amplifier channels which are charged by three transformers having their secondaries connected to the three lines of the load circuit which feeds the synchronous motor. Preferably, connecting tubes are inserted between the tubes of the ring-of-three circuit and the corresponding tubes of the power amplifier channels to prevent the possible grid current of the power tubes from interfering with the operation of said ring-of-three circuit and to act simultaneously as tension amplifiers.

The three transformers have preferably their primaries adjusted, according to the frequency of the single-phase sync signals, and connected to an upstream harmonic filtering device which eliminates the harmonics of said sync signals for obtaining sinusoidal signals.

Another object of this invention is to provide novel industrial applications deriving from the arrangement broadly specified hereinabove, notably:

(I)—for converting any magnitude into a velocity of rotation proportional to this magnitude, for example for integrating purposes, notably in chronometry, synchronization, counting, ranging, etc. . . ., possibly through hertzian wave transmission;

(II)—for transmitting a synchronous velocity by substituting a single-phase signal of zero power for the three-phase alternating transmitter normally utilized for this purpose, especially for gaging or controlling synchronous-motor speed indicators.

More particularly, when the synchronous motor is to be run at predetermined, different velocities, the device according to the present invention is fed through a frequency box, the input frequency of this frequency box being the lowest common multiple among the frequencies to be delivered by the box for operating the synchronous motor at predetermined different velocities.

In this case the three transformers have their primaries adjusted, according to the frequency fed thereto, through an adjusting switch and the power-amplifier tubes are so biased that they operate practically as Class-B amplifiers; in other words, in the inoperative conditions their anode current is zero.

If it is desired to attain a high degree of accuracy, the input frequency of the frequency box will be supplied from a standard quartz oscillator, scaling electron devices being interposed between this oscillator and the frequency box if the input frequency calculated as indicated hereinabove is too low to be supplied directly from a quartz oscillator.

An advantageous use of these last-mentioned arrangements consists in the remote gaging of tachometers. As a rule, these tachometers are equipped with a transmitter alternator and a receiving synchronous motor driving the tachometer proper, and the tachometer is gaged by driving this synchronous motor at variable speeds measurable with a greater accuracy than that of the tachometer proper. The gaging and control reading are effected according to two different methods:

(a) the "run up test" method, consisting in imparting to the tachometer a velocity of round value and reading on the tachometer dial the difference between its needle position and the corresponding graduation;

(b) the "adjustment" method, wherein the driving velocity is so adjusted that the tachometer needle will be just coincident with a graduation mark, the exact value of this driving velocity being determined through other means.

As a rule, the tachometer is driven from its own alternator mounted on a variable-speed stand, and the driving speed is measured either through a stroboscopic method applicable in the case of a "run up test" measurement, or through a pulse counter in the case of a measurement effected according to the "adjustment" method.

According to the present invention, in view of driving directly the tachometer synchronous motor without utilizing a rotary generator and simultaneously determining the exact velocity, a device of the general type specified hereinabove is provided to drive this synchronous motor at predetermined different velocities, the fixed velocities being obtained through the frequency box from the standard quartz oscillator, the adjustable velocities being produced through the same frequency box from an adjustable oscillator the rated frequency of which is the same as that of the aforesaid standard quartz oscillator and may be varied by predetermined quantities above or below this rated value, both oscillators being if desired connected to the frequency box across one or a plurality of electron scaling elements, the accuracy of adjustment of the adjustable oscillator with respect to the standard oscillator being determined through an electronic beat indicator. The oscillating circuit of the adjustable oscillator comprises a stationary feedback coil and a set of capacitors comprising a stable stationary capacitor, a variable capacitor equipped with a dial graduated in accordance with the variation in the standard frequency, and a gaging capacitor having external control means.

The accompanying drawings forming part of this specification illustrate diagrammatically by way of example the manner in which the invention may be carried out in the practice. In the drawings.

Figure 3:
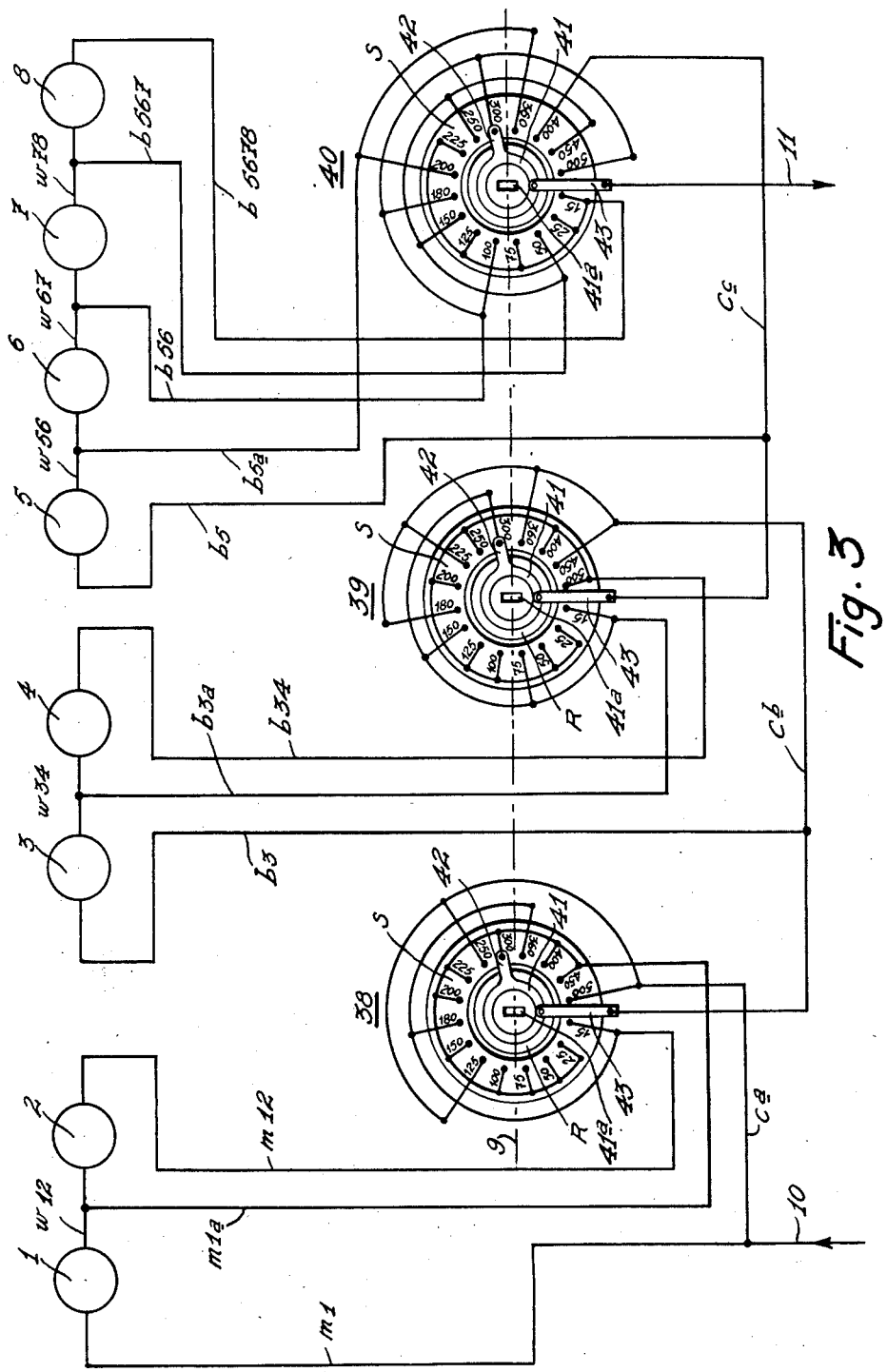
Figure 4:
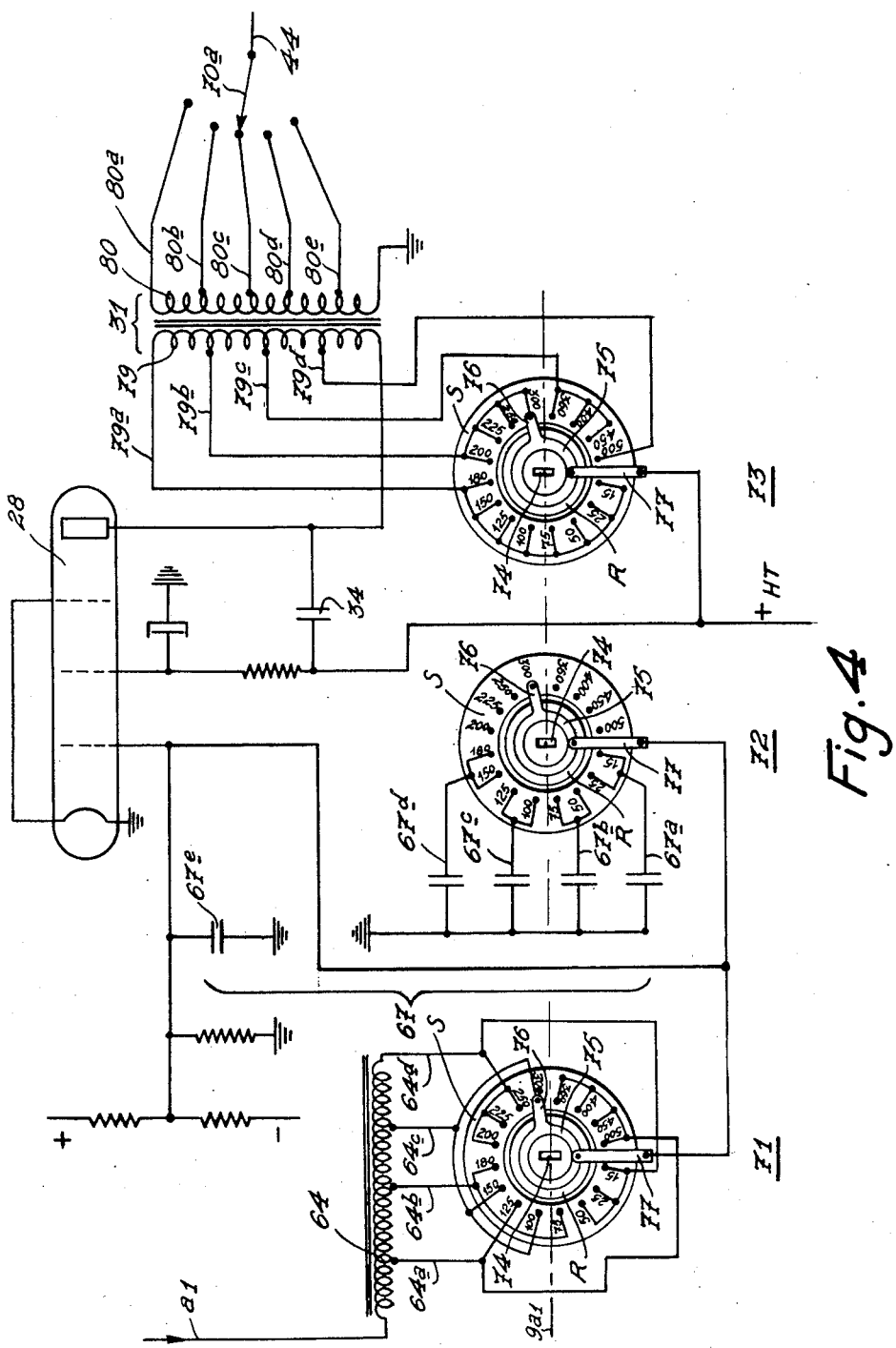

Figure 3 diagrammatically represents the switching device of the frequency box; and Figure 4 diagrammatically represents the switching-device for filtering the harmonics and tuning the primaries of the output transformers.

Figure 1:
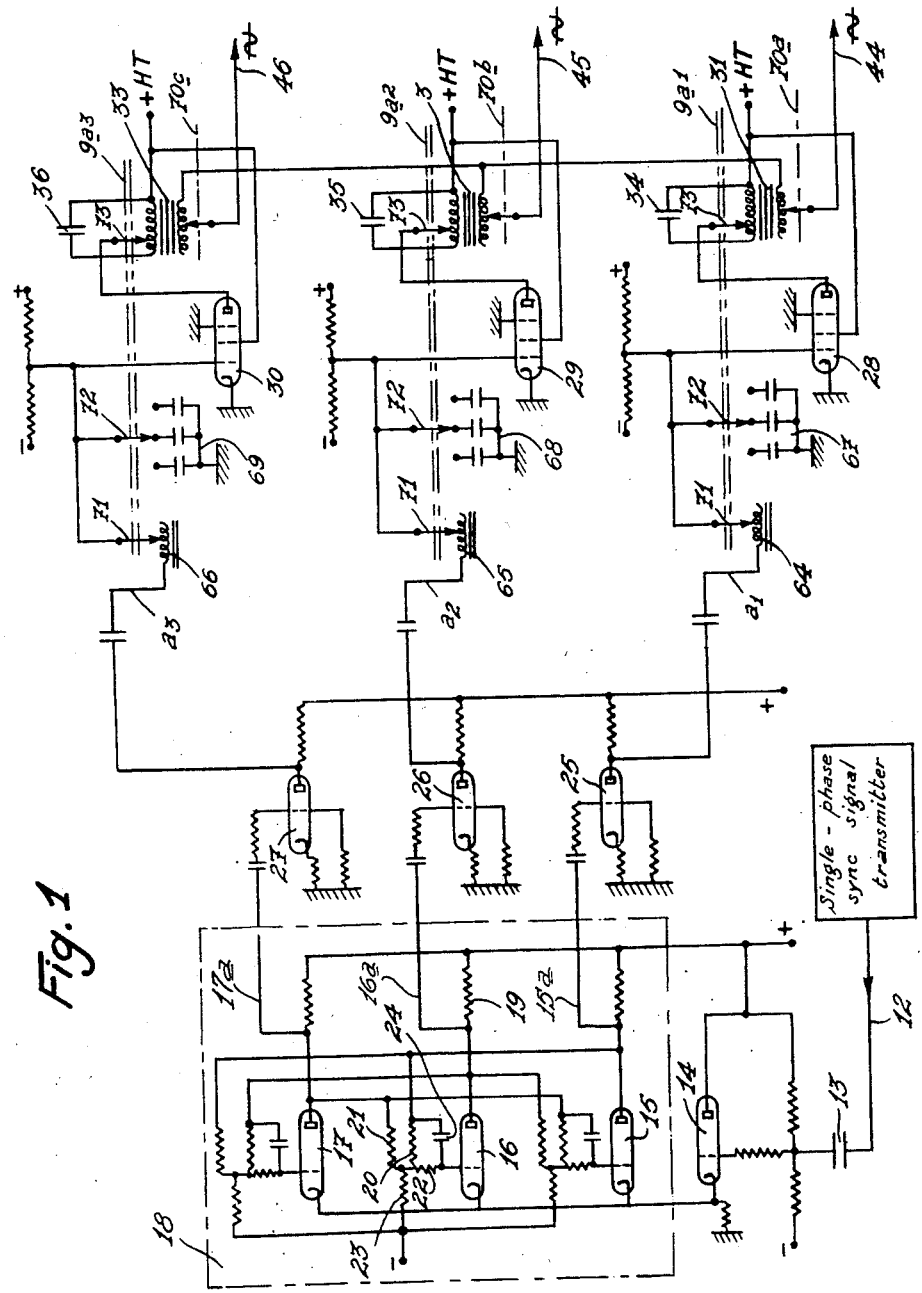
Figure 1 is a wiring diagram of a device for driving three-phase synchronous motors from single-phase sync signals of adequate waveform.

The sync signals received at 12 at a frequency $f$ (Fig. 1), after having been shaped, if need be, to give them a proper waveform with positive peaks, are fed to a cathode-loaded triode 14 having its grid normally biased beyond cut-off voltage, this triode 14 being connected to energize in turn the triodes 15, 16 and 17 of a ring-of-three circuit designated by the reference number 18.

As well known the anodes of triodes 15, 16 and 17 charged by resistors such as 19 are coupled respectively to the grids of all the other triodes of the ring-of-three circuit through resistors such as 20, 21, 22 and 23. Moreover, capacitors such as 24 connect the anode of each triode to the grid of the next triode in the circuit arrangement.

In the inoperative condition only one triode, for instance the triode 15, is conductive, the other triodes being blocked. The positive pulses delivered by the capacitor 13 and corresponding to the positive peaks of the signals having a waveform shaped accordingly are transmitted through the leading tube 14 to the aforesaid triodes 15, 16 and 17. The triodes 15 and 16 constitute an asymmetrical trigger-circuit element since the capacitor 24 is connected only across the anode of triode 15 and the grid of triode 16. When the pulse peak is attained both triodes 15 and 16 are blocked and this capacitor 24 transmits a positive pulse to the grid of triode 16, thereby causing the trigger-circuit to be reversed so that the triode 16 becomes conductive while the triode 15 is blocked. By becoming conductive the triode 16 transmits to the grid of triode 17 a negative pulse which is inoperative because this last-mentioned triode is already blocked. On the other hand, the pulse is transmitted through the triode 16 to a connecting triode 26 of a system comprising three "connecting" triodes 25, 26 and 27 acting as tension amplifiers and having their grids connected to the anodes of triodes 15, 16 and 17, respectively, through three independent wires 15a, 16a and 17a.

The second pulse originated by the positive peak of the second signal delivered by capacitor 13 will block the triode 16 and cause the triode 17 to become conductive for transmitting this signal to the connecting triode 27 through wire 17a. Similarly, the third pulse occasionated by the positive peak of the third signal fed from capacitor 13 will block the triode 17 and cause the triode 15 to become conductive to enable this signal to be transmitted to the connecting triode 25 through wire 15a. Thus, the connecting triodes 25, 26 and 27 are fed with three phase-shifted signals generated by three successive sync signals. The three wires 15a, 16a and 17a form a three-phase intermediate circuit, the three-phase current flowing through said intermediate three-phase circuit having a frequency equal to $f/3$.

The connecting triodes 25, 26 and 27 are adapted to energize separately three power pentodes 28, 29 and 30 of the power stages A, the grid bias of these pentodes being adjusted to cancel completely the anode current in their inoperative condition. Between said connecting triodes 25, 26 and 27, and said power pentodes 28, 29 and 30 are inserted harmonic filtering devices comprising multi-tapped inductances 64, 65 and 66 and sets of fixed capacitors 67, 68 and 69 adapted to be separately mounted in series with said inductances. The power pentodes 28, 29 and 30 are charged through transformers 31, 32 and 33 having multi-tapped primaries adjustable according to the sync signals frequency, said primaries being shunted by fixed capacitors 34, 35 and 36. The multi-tapped inductances 64 to 66, the sets of capacitors 67 to 69 and the multi-tapped primaries of the transformers 31 to 33 are controlled by mechanical devices 9a1, 9a2 and 9a3. The secondaries of transformers 31, 32 and 33 supply the power to the three wires 44, 45 and 46 of a three-phase load circuit. From the foregoing, it is now apparent that the frequency of this line is W/3, i. e. one-third the input sync signal frequency. Said secondaries are multi-tapped and are controlled by mechanical devices 70a, 70b and 70c with a view to adjust the electron power amplification to the characteristics of the motor to be energized, without however modifying the speed ranges.

Figure 2:
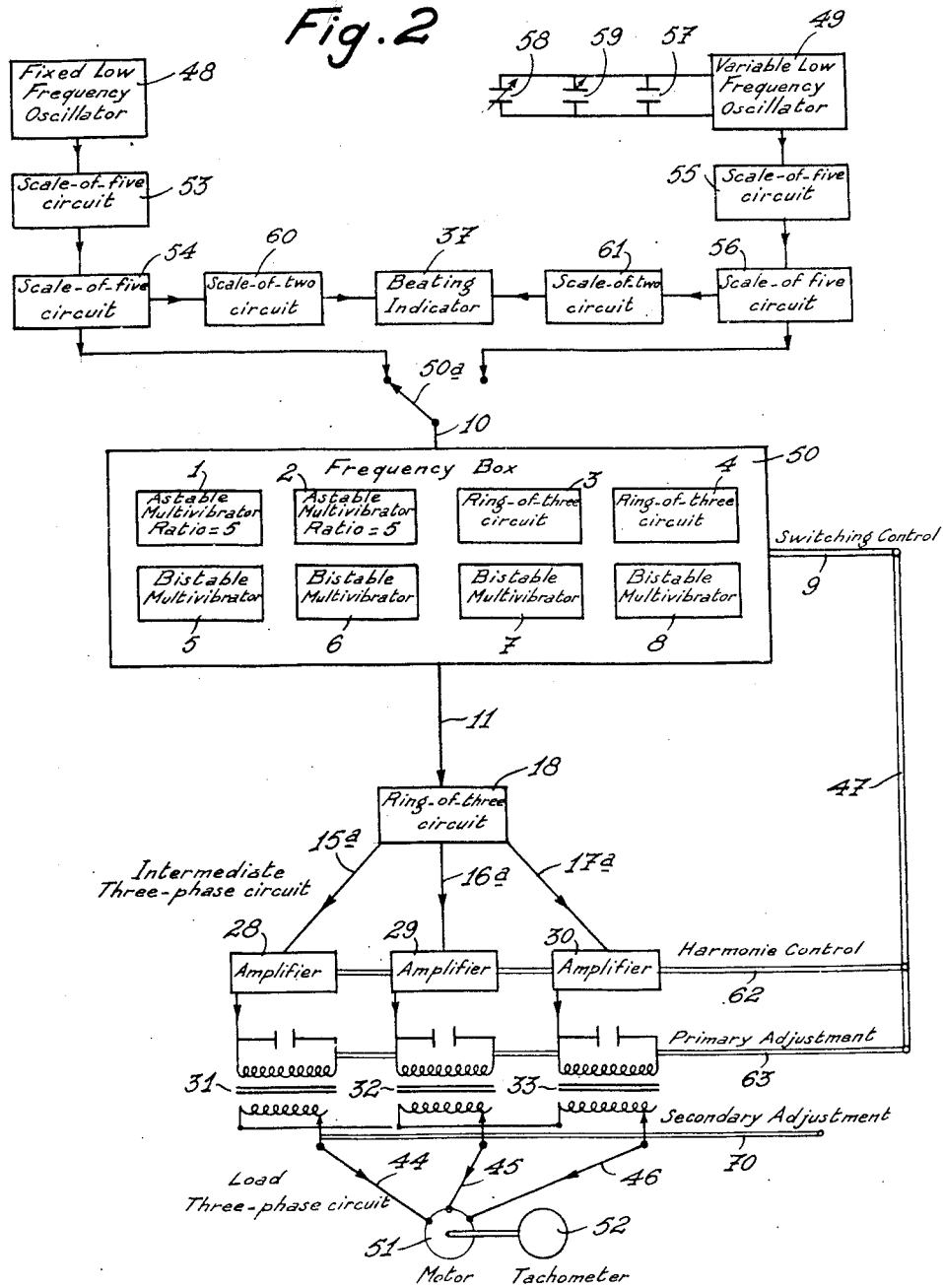
Figure 2 is a block diagram showing the electronic elements utilized in a three-phase electron generator adapted for gaging synchronous-motor tachometers, together with the connections between these various elements.

The embodiment shown in Fig. 2 relates to a three-phase electron generator designed for gaging synchronous-motor tachometers by both the "run up test" method and the "adjustment" method. This generator comprises a standard quartz oscillator 48 and an adjustable oscillator 49 supplying pulses to an electron frequency box 50 of the type described in the aforesaid U. S. patent co-pending application; the output of this frequency box is fed to the ring-of-three circuit 18, and this circuit energizes in turn the three power pentodes 28, 29 and 30 of the three separate power stages A feeding through the transformers 31, 32 and 33 with adjustable primaries the three-phase load circuit 44, 45 and 46 connected to the synchronous motor 51 driving the tachometer 52.

If the synchronous motor 51 is to drive the tachometer 52 at the following velocities (in R. P. M.) 5,000— 4,500–4,000 — 3,600 — 3,000 — 2,500 — 2,250 — 2,000 — 1,800 — 1,500 — 1,350 — 1,000 — 750 — 500 — 250 — 150 and if this motor is of the four-pole type, the three-phase frequencies of the three-phase load circuit 44, 45, 46 must be twice the number of revolutions per second corresponding to these R. P. M. numbers. Since on the other hand the conversion of the output signals from the frequency box 50 into three-phase signals by the ring-of-three circuit 18 will divide these output frequencies by three, it is apparent that these last-mentioned frequencies must be three times the three-phase frequencies whilst the input frequency of the frequency box 50 must be equal to 18,000 Hz., as this number is the lowest common multiple of the box output frequencies likely to impart the above-listed velocities to the synchronous motor. As this 18,000-Hz. frequency is too low to permit the use of a quartz and the construction of a simple variable oscillator, the standard and variable oscillators will have a frequency of 270 kHz. and these frequencies will be divided by 15 to provide the aforesaid input frequency of 18,000 Hz.

The standard quartz oscillator 48 is for this purpose connected to the frequency box 50 through an astable multivibrator 53, acting as scale-of-five element and having its output connected to another astable multivibrator 54 acting as scale-of-three element; similarly, the adjustable oscillator 49 is connected to the frequency box 50 through an astable multivibrator 55 acting as scale-of-five element and adapted to feed an astable multivibrator 56 acting as scale-of-three element, both oscillators being connected independently to the frequency box through a two-way switch 50a.

The rated frequency of the adjustable oscillator 49 is also set at 270 kHz. Its oscillating circuit comprises a stationary feedback coil (not shown) and a set of capacitors comprising a fixed stable capacitor 57, a variable capacitor 58 with a dial graduated from minus 10 thousandths to plus 10 thousandths, together with a gaging capacitor 59 with external control. The variable capacitor 58 comprises a fixed blade divided into deformable segments adjustable by means of a screw so that the dividing lines of the graduation will correspond exactly to the frequency variation contemplated. When this variable capacitor is set on the "zero" mark, the frequency of the adjustable oscillator 49 must be 270 kHz.

This frequency is compared with that of the standard oscillator 48 by means of a beat indicator consisting of a neon tube 37 connected across the plates of triodes respectively belonging to scale-of-two elements 60 and 61, fed in turn by astable multivibrators 54 and 56, respectively.

The standard 18,000 Hz. frequency from the output of astable multivibrator 54 and the variable 18,000 Hz. frequency from the output of astable multivibrator 56 are divided separately by two scale-of-two elements 60 and 61, and the neon tube 37 indicates the resulting frequencies, i. e. standard 9,000 Hz. and variable 9,000 Hz. With the dial of variable capacitor 58 set to zero, the gaging capacitor 59 permits of adjusting the rated frequency of the variable oscillator until the beat does not exceed one per second, thereby assuring a degree of accuracy of 1:9,000.

Finally, the electron frequency box 50 is equipped with two astable multivibrators 1, 2 acting as scale-of-five elements, two ring-of-three circuits 3, 4 acting as scale-of-three elements, and four bistable multivibrators 5, 6, 7 and 8 acting as scale-of-two elements. The selection of the proper circuit of these scaling elements formed by said multivibrators and said ring-of-three circuits, in view of obtaining a predetermined frequency at the output of this box, is carried out by a sixteen-position switch 53 controlled by the mechanical device 9. Said control device 9 as well as the devices 62 and 63 controlling the harmonic filtering device and the adjusting device for the primaries of the output transformers may be connected to a main controlling device 47.

To gage the tachometer 52 the fixed velocities are obtained from the standard quartz oscillator 48 with an accuracy of 1:10,000. The adjustable speeds are obtained from the adjustable oscillator 49 the rated frequency of which is the same as that of the aforesaid quartz, this frequency having permissible plus and minus limits of 10% about this value.

The block diagram of Fig. 2 may be applied as a whole for the electronic three-phase feeding of a synchronous motor at different, predetermined speeds. In this case, it will be sufficient to dispense with the adjustable oscillator 49, its scaling elements and the beat stage comprising the neon tube 37. The quartz oscillator 48 will feed alone the frequency box 50 and the various electron scaling elements of this box will be calculated in view of producing single-phase sync signals at the frequency-box output which are subsequently converted into three-phase signals adapted to be supplied to a three-phase line connected to the synchronous motor. The frequencies of the standard oscillator, the bases of the electron scaling elements of the frequency box and possibly of those interposed between this standard oscillator and the frequency box, are determined according to these predetermined speeds, with due consideration for the number of poles of the motor.

The sixteen-position switch for the frequency box illustrated in Fig. 3 is similar to that illustrated in Fig. 4 of the aforesaid U. S. patent application relating to a frequency box. It comprises three sixteen-position switch elements 38, 39 and 40 having stators S and rotors R, the latter being formed with holes 41a for engaging a rectangular bar 9 not shown. The arrangement and the operation of said sixteen-position switch disclosed in said U. S. patent application does not necessitate a special disclosure.

Fig. 4 illustrates the circuits and the elements for controlling the harmonic filtering device, the primary and the secondary of the output transformer for the power amplifier channel comprising inductance 64, capacitor set 67, power pentode 28 and transformer 31.

The control device for filtering the harmonics and adjusting the primary of transformer 31 is formed by a multiple-position switch having three sixteen-position switch elements 71, 72 and 73 with rotors R and stators S. The three rotors R engage through holes 74 formed therethrough the control device 9a1, not shown, formed by a rectangular bar one end of which carries a control knob. Each stator made of insulating material carries sixteen contact pieces respectively referenced according to the output frequencies of the frequency box in Hz., namely from 15 to 500. Each rotor made of insulating material carries a conducting ring 75 formed with a projection 76 acting as contact brush for engaging the contact pieces of the corresponding stator. A contact brush 77 engages the conducting ring 75.

The inductance 64 which is connected through wire a1 to the anode of connecting triode 25 is formed with tappings 64a to 64d. Said tappings are respectively connected to certain contact pieces of switch element 71 in accordance to the utilisation of the device. The brush 77 of said switch element 71 is connected to the brush 77 of the switch element 72. The stationary contact pieces of said switch element 72 are respectively connected to capacitors 67a to 67e which form the capacitor set 67. The brushes 77 of switch elements 71 and 72 are connected to the grid of pentode 28.

The power pentode 28 is charged through transformer 31 the primary 79 of which is shunted by a fixed capacitor 34 and is formed with multiple tappings 79a to 79d respectively connected to certain contact pieces of switch element 73. The brush 77 of said switch element 73 is connected to the high tension source which feeds the grid of power pentode 28.

In the arrangement shown in Fig. 4 the brushes 76 of the rotors engage the contact pieces of the stators which correspond to an output frequency of the box frequency equal to 300 Hz. The anode of connecting triode 25 is connected to the grid of power pentode 28 through the following circuit: wire a1—inductance 64—tapping 64c—contact piece 300 of switch member 71—brush 77 of switch member 71—and grid of pentode 28, capacitor 67e being series connected by the brush 77 of switch element 72. Pentode 28 is fed in high tension current through the primary of transformer 31 as follows: plus H. T.—brush 77 of switch element 73—brush 76 of switch element 73—contact piece 300 of switch element 73—tapping 79b—primary 79 and plate of pentode 28, capacitor 34 being mounted in parallel on the ends of primary 79.

The control devices 9 for switching the frequency box, 62 for filtering the harmonics and 63 for adjusting the primaries of the output transformers, said two last devices consisting of elementary control devices 9a1, 9a2 and 9a3, may be formed by a single member connected to switch elements 38 to 41 and 71 to 78, which elements are aligned, by passing through holes 41a and 74.

The secondary 80 of transformer 31 is formed with multiple tappings 80a to 80e which are engaged by a brush 70a connected to wire 44. The brushes 70a, 70b and 70c are controlled through a single member 70.

Of course, many details of the arrangement described hereinabove and shown in the accompanying drawings may be modified without departing from the spirit and scope of the invention.

What I claim is:

1. A single-phase sync signal control device of three-phase circuits, comprising a source of single-phase sync signals, a three-phase circuit having three lines, and means for respectively applying to said three lines the first, second and third sync signals in each successive group of three single-phase sync signals to obtain in said three lines signals which are equally phase shifted with respect to each other for forming a three-phase current the frequency of which is equal to one third of the frequency of the single-phase sync signals.

2. A single-phase sync signal control device of three-phase circuits, comprising a source of single-phase sync signals, a three-phase circuit having three lines, means for respectively applying to said three lines the first, second and third sync signals in each successive group of three single-phase sync signals to obtain in said three lines signals which are equally phase shifted with respect to each other for forming a three-phase current the frequency of which is equal to one third of the frequency of the single-phase sync signals, and means for eliminating the harmonics of the sync signals applied to each line of the three-phase circuit, whereby the three-phase current flowing through said circuit is sinoidal.

3. A control device, according to claim 2, further comprising amplifying means interposed in each line for receiving the output of the eliminating means to amplify the amplitude of the signals applied to said line.

4. A single-phase sync signal control device of three-phase circuits, comprising a source of single-phase sync signals, a three-phase circuit having three-lines, means for respectively applying to said three lines the first, second and third sync signals in each successive group of three-signal-phase sync signals to obtain in said three lines signals which are equally phase shifted with respect to each other for forming a three-phase current the frequency of which is equal to one third of the frequency of the single-phase sync signals, means for eliminating the harmonics of the sync signals applied to each line of the three-phase circuit, separate power amplifier channels respectively coupled to said lines, a three-phase load circuit having three lines, and transformers respectively coupling the output of said power amplifier channels to the lines of said three-phase load circuit, whereby the three-phase current flowing through said three-phase load circuit is sinoidal.

5. A single-phase sync signal control device of three-phase circuits, comprising a source of single-phase sync signals, a three-phase circuit having three lines, a leading electron cathode-loaded tube connected to said source, and a ring-of-three counting circuit having three electron tubes provided with cathode circuits connected in parallel with the output of said leading electron tube and with anode circuits respectively connected to said three-lines, whereby said lines receive successively the first, second and third sync signals in each successive group of three single-phase sync signals entering said ring-of-three counting circuit to obtain in said three lines signals which are equally phase shifted with respect to each other for forming a three-phase current the frequency of which is equal to one third of the frequency of the single-phase sync signals.

6. A single-phase sync signal control device of three-phase circuits, comprising a source of variable low frequency single-phase sync signals, means for adjusting said frequency, a three-phase circuit having three lines, a leading electron cathode-loaded tube connected to said source, a ring-of-three counting circuit having three electron tubes provided with cathode circuits connected in parallel with the output of said leading electron tube and with anode circuits respectively connected to said three lines, whereby said lines receive successively the first, second and third sync signals in each successive group of three single-phase sync signals, entering said ring-of-three counting circuit, adjustable means for eliminating the harmonics of the sync signals applied to each line of the three-phase circuit, and means for adjusting said eliminating means, whereby the three-phase current flowing through said circuit is sinoidal.

7. A single-phase sync signal control device of three-phase circuits, comprising a source of variable low frequency single-phase sync signals, means for adjusting said frequency, a three-phase circuit having three lines, a leading electron cathode-loaded tube connected to said source, a ring-of-three counting circuit having three electron tubes provided with cathode circuits connected in parallel with the output of said leading electron tube and with anode circuits respectively connected to said three lines, whereby said lines receive successively the first, second and third sync signals in each successive group of three-single- phase sync signals entering said ring-of-three counting circuit, adjustable means for eliminating the harmonics of the sync signals applied to each line of the three-phase circuit, means for adjusting said eliminating means, separate power amplifier channels each one of which has an electron power tube provided with an input grid circuit and an output anode circuit, a three-phase load circuit having three lines, transformers respectively coupling said output anode circuits to the lines of said load circuit, an electron device interconnecting respectively the lines of said intermediate circuit and the input grid circuits of said power tubes and preventing the grid current of said power tubes from disturbing the operation of the ring-of-three circuit, whereby the three-phase current flowing through said three-phase load circuit is sinoidal.

8. A control device, according to claim 7, wherein the means for eliminating the harmonics, and for adjusting said eliminating means comprise adjustable harmonic filtering devices respectively mounted in series in the input grid circuits of the power tubes and each one of which comprises a multi-tapped inductance, and a set of fixed capacitors separately connected in series with said inductance; and a multiple-position switch comprising for each power amplifier channel a group of two multiple-position switch elements having movable brushes and the same number of contact pieces for being successively engaged by said brushes and respectively connected by the first element to the taps of the corresponding multi-tapped inductance and by the second element to the capacitors of the corresponding set of capacitors, the brushes of the first and second elements in each group being mounted in series in the grid circuit of the corresponding power tube, and a single control element mechanically connected to the brushes of the elements of said groups, the connections of the contact pieces with the taps and the capacitors being so determined that for each switching position the values of the inductances and capacitors are in accordance with the corresponding adjusted frequency of the single-phase sync signals.

9. A control device, according to claim 7, wherein the source of adjustable low frequency single-phase sync signals and the means for adjusting said frequency comprise a low frequency single-phase sync signals generator and a frequency box connected to the leading tube and to which said sync signals are applied, said frequency box applying to said leading tube output signal-phase sync signals having different frequencies the lowest common multiple of which is equal to the frequency of the sync signals emitted by said generator, whereby when said different output frequencies are determined in correspondance with predetermined different speeds of a three-phase synchronous motor, by connection of said motor to the three-phase load circuit the three-phase control device controls said motor at said predetermined different speeds.

10. A control device, according to claim 7, wherein the source of adjustable low frequency single-phase sync signals and the means for adjusting said frequency comprise a generator for low frequency single-phase sync signals operating at a fixed frequency, a second generator for low frequency single-phase sync signals operating at a variable frequency which is near said fixed frequency, means for varying the frequency of the sync signals emitted by said second generator on either side of said fixed frequency, an electron beat indicator connected to said generators for determining the rated frequency of the second generator, electron scaling circuits respectively inserted between said generators and said electron beat indicator, a frequency box connected to the leading tube, means for applying separately to said frequency box the sync signals emitted by said generators, said frequency box applying to said leading tube output signal-phase sync signals having different frequencies the lowest common multiple of which is equal to the frequency of the sync signals emitted by said generator, whereby when said different output frequencies are determined in correspondance with predetermined different speeds of a three-phase synchronous motor driving a tachometer, by connection of said motor to the three-phase load circuit the three-phase control device gages said tachometer through both the "run up test" and the "adjustment" methods, by respectively applying the sync signals of the first and second generators to said frequency box.

References Cited in the file of this patent

UNITED STATES PATENTS

| | | |
|---|---|---|
| 2,333,502 | Wickham | Nov. 2, 1943 |
| 2,340,875 | Gibbs | Feb. 8, 1944 |
| 2,516,308 | Forrester et al. | July 25, 1950 |
| 2,623,203 | Demuth | Dec. 23, 1952 |